United States Patent [19]
Keesman

[11] Patent Number: 5,768,436
[45] Date of Patent: Jun. 16, 1998

[54] DEVICE AND METHOD FOR CODING VIDEO PICTURES

[75] Inventor: Gerrit J. Keesman, Eindhoven, Netherlands

[73] Assignee: U.S. Philips Corporation, New York, N.Y.

[21] Appl. No.: 637,255

[22] Filed: Apr. 24, 1996

[30] Foreign Application Priority Data

Apr. 25, 1995 [EP] European Pat. Off. ............ 95201056

[51] Int. Cl.$^6$ .................... G06K 9/36; G06K 9/46
[52] U.S. Cl. ............... 382/248; 382/239; 382/251; 348/405
[58] Field of Search .................... 382/239, 248, 382/250, 251; 358/430, 433; 348/405, 406, 419

[56] References Cited

U.S. PATENT DOCUMENTS 5,426,512 6/1995 Watson .................... 358/426
5,495,292 2/1996 Zhang et al. .................... 348/407

OTHER PUBLICATIONS

Ramchandran et al., "Rate–Distortion Optimal Fast Thresholding With Complete JPEG/MPEG Decoder Compatibility" IEEE Transactions On Image Processing, vol. 3, No. 5, Sep. 1994, pp. 700–704.

*Primary Examiner*—Leo H. Boudreau
*Assistant Examiner*—Phuoc Tran
*Attorney, Agent, or Firm*—Laurie E. Gathman

[57] ABSTRACT

The picture quality of an MPEG-encoded video signal is improved considerably by reducing the coefficients after quantization in such a way that the "Lagrangian cost" $D+\lambda R$ (D is distortion, R is bitrate) is minimal for a given value of the "Lagrange multiplier" $\lambda$. The distortion decreases because the step size is reduced while the bitrate remains equal.

8 Claims, 4 Drawing Sheets

DEVICE AND METHOD FOR CODING VIDEO PICTURES

FIELD OF THE INVENTION

The invention relates to a device and method for coding video pictures, comprising a picture transformer for block-sequentially transforming pixels into coefficients, a quantizer for quantizing the coefficients with a given step size, and a variable-length coding circuit for coding the quantized coefficients.

BACKGROUND OF THE INVENTION

An example of such a video coding has meanwhile become generally known by the name of MPEG. The finer the quantization step size, the better the quality of the reproduced picture but the larger the number of bits which is required for the transmission of this picture.

"Ramchandran and Vetterli: Rate-Distortion Optimal Fast Thresholding with complete JPEG/MPEG Decoder Compatibility", IEEE Transactions on Image Processing, Vol. 3, No. 5, September 1994 describes a method of further improving the picture quality. This method will briefly be summarized with reference to FIG. 1. In this Figure, the reference numeral 100 denotes a rate-distortion curve (hereinafter abbreviated to RD curve) for a range of step sizes Δ. In the prior art method, the quantized coefficients are subjected to a thresholding process. This is understood to mean that selected non-zero coefficients are forced to assume the value zero. By thresholding, the bitrate will be lower (in fact, fewer non-zero coefficients are transmitted) and the distortion will be larger. In FIG. 1, curve 101 represents an RD curve if the thresholding operation is performed on coefficients which have been quantized with a step size Δ1. Curve 102 represents an RD curve if the thresholding operation is performed on coefficients which have been quantized with a larger step size Δ2. The curves 101 and 102 will hereinafter be referred to as thresholding curves. They are obtained by determining the minimum value of what is known as the "Lagrangian cost" for different values of the "Lagrange multiplier" λ. The Lagrangian cost is defined as:

$$L(b,\lambda)=D(b)+\lambda \cdot R(b)$$

In this expression, b represents a set of coefficients to be transmitted. D(b) and R(b) are the distortion and the bitrate, respectively, upon transmission of these coefficients. The Lagrange multiplier λ is a natural number which is larger than or equal to 0. For each λ, a thresholding operation can be found which yields a set b of coefficients for which $L(b,\lambda)$ is minimal. The distortion D(b) and bitrate R(b) applying to this set constitutes a point on the thresholding curve. The starting point (λ=0) is always on the curve 100. As λ increases, the distortion will be larger and the bitrate lower.

As is apparent from FIG. 1, a given bitrate R1 can be achieved both by (i) quantizing the coefficients with step size Δ2 and transmitting all quantized coefficients, and by (ii) quantizing the coefficients with a smaller step size Δ1 and thresholding selected coefficients. Apparently, option (ii) is more favourable because it yields less distortion.

The curves 101 and 102 shown are only two curves of many possible thresholding curves. The envelope thereof, denoted by 103 in the Figure, constitutes the optimal RD curve for a given picture. It is completely below curve 100. In other words, at any desired bitrate, thresholding may result in a step size Δ and a Lagrange multiplier λ which yields a smaller distortion than when thresholding is not carried out.

OBJECT AND SUMMARY OF THE INVENTION

It is an object of the invention to further improve the picture quality of a video coding device in a simple manner.

To this end, the device according to the invention is characterized in that the quantizer is adapted to quantize the coefficients to a quantization level which is lower than the most proximate quantization level and unequal to zero. The picture quality of an MPEG encoder is significantly improved hereby. Moreover, the process can be more easily implemented because the optimization for each coefficient takes place separately. It is not necessary to make an optimal choice from a large range of possibilities, as is the case in the state of the art. It is possible, but not necessary, that the quantized coefficients are assigned the lower value for which $D+\lambda R$ is minimal.

In an embodiment of the device, this device further comprises means for rendering coefficients zero if said zero-rendering operation yields a lower $D+\lambda R$ for said coefficients. This combination of reducing and thresholding coefficients yields a better picture quality than in the device of the state of the art. Moreover, the process is simple because the thresholding operation is performed separately for each coefficient.

In a further embodiment, the device further comprises means for rendering all coefficients of a picture block zero if this yields a lower $D+\lambda R$ for said picture block. This leads to an even further improvement of the picture quality.

These and other aspects of the invention will be apparent from and elucidated with reference to the embodiments described hereinafter.

DESCRIPTION OF EMBODIMENTS

Figure 2:
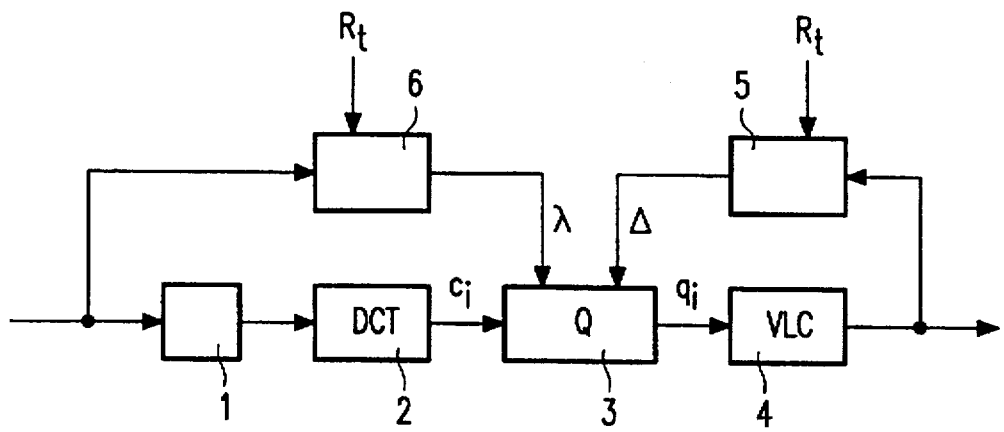
FIG. 2 shows a device for coding a video signal according to the invention.

FIG. 2 shows a device for coding a video signal according to the invention. The device comprises a delay 1, a picture transformer 2, a quantizer 3, a variable-length coding circuit 4, a bitrate control circuit 5 and a λ calculator 6. An important aspect of the invention is that the video signal can be encoded in accordance with the MPEG standard. To this end, the picture transformer 2, the variable-length coding circuit 4 and the bitrate control circuit 5 in this embodiment are identical to the corresponding elements of the generally known MPEG encoder. Therefore, they are not described in detail. For the sake of simplicity, FIG. 2 only shows the elements which are necessary for intraframe coding. The invention is also applicable to interframe coding. The applied picture is then first subtracted from a motion-compensated prediction picture, whereafter the residue thus obtained is coded.

In the picture transformer 2, the applied picture is block-sequentially subjected to a picture transform. In the embodiment, Discrete Cosine Transform (DCT) is used. Any suitable frequency transform may, however, be used, including sub-band filtering. The DCT transforms each picture block of, for example 8*8 pixels into a block of 8*8 coefficients $c_i$, in which i=0 . . . 63 indicates the order of increasing extent of picture detail.

The DCT coefficients $c_i$ are applied to the quantizer 3 which images each coefficient $c_i$ at a discrete quantization level. The quantization levels are spaced apart by a step size $\Delta_i$. For reasons of compatibility with the MPEG standard, the step size $\Delta_i$ is coefficient-dependent in conformity with weighting factors $W_i$ which are stored in a quantization matrix. The quantization step size is controlled per block by the bitrate control circuit 5 which applies a step size $\Delta$ to the quantizer. The step size $\Delta_i$ is calculated in accordance with the expression $$\Delta_i = c \cdot W_i \Delta$$

in which i denotes a spatial frequency, $W_i$ is the weighting factor for said spatial frequency, and c is a constant.

In a conventional MPEG encoder, the quantizer images each coefficient $c_i$ at one of the two nearest quantization levels. In accordance with the invention, quantizer 3 also receives a Lagrange multiplier $\lambda$. Dependent on $\lambda$, the quantizer now images a coefficient $c_i$ at a different than the nearest quantization level. More particularly, the quantizer forces a coefficient to assume a different level if that is more efficient in a rate-distortion sense. Embodiments of quantizer 3 and $\lambda$-calculator 6 will be described in greater detail. The quantized coefficients $q_i$ are subsequently applied to a variable-length coding circuit 4. This circuit forms a variable-length codeword for each non-zero coefficient and a possibly preceding series of non-zero coefficients in conformity with the MPEG standard. The codewords formed are transmitted after buffering (not shown) via a transmission channel. The codewords are also applied to the bitrate control circuit 5. This circuit controls the step size $\Delta$ in further known manner in such a way that the number of bits per block is always as much as possible in conformity with a predetermined target $R_r$.

The Lagrange multiplier $\lambda$ is applied to the quantizer by $\lambda$-calculator 6. This calculator calculates $\lambda$ by analysis of the picture to be coded. To this end, the video signal is directly applied to the $\lambda$-calculator, while the actual coding of the signal (transform, quantization, variable-length coding) takes place after it has been delayed by one picture period via delay 1.

Figure 3:
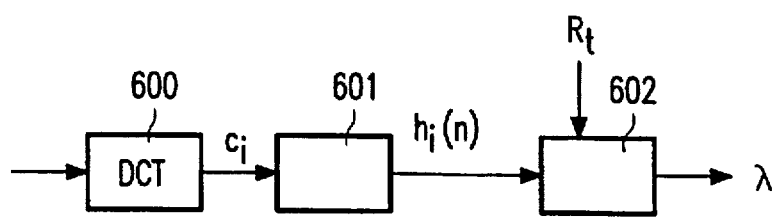
FIG. 3 shows the block diagram of a λ calculator shown in FIG. 2.

FIG. 3 shows the block diagram of $\lambda$-calculator 6. The calculator comprises a picture transformer 600, a counting circuit 601, and a computing circuit 602. The picture transformer 600 is identical to picture transformer 2 in FIG. 2 and supplies 64 coefficients $c_i$ (i=0 . . . 63) for each block. The DCT coefficients have an amplitude n in the range [−2047, 2048]. The counting circuit 601 counts for each coefficient $c_i$ how often this coefficient has the amplitude n and thus constitutes a histogram of the amplitude distribution for each coefficient. The number of times when the coefficient $c_i$ assumes the value n is recorded in counters $h_i(n)$.

Figure 4:
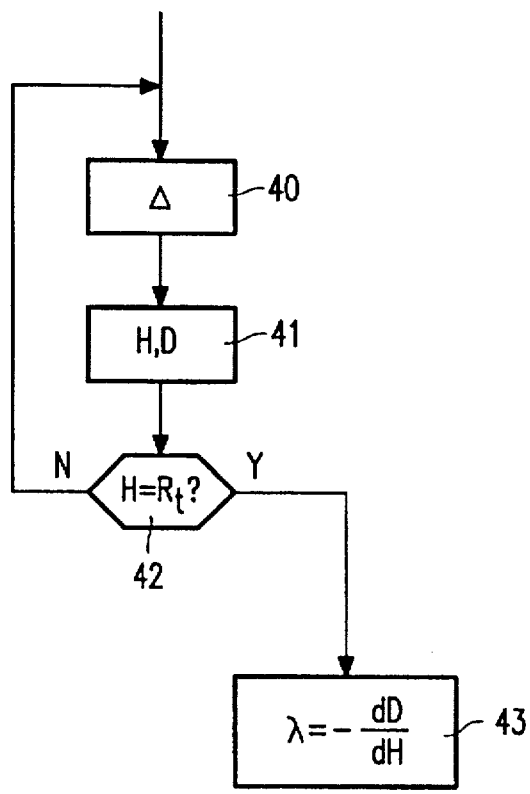
FIG. 4 shows a flow chart to explain the operation of a computing circuit shown in FIG. 3.

The operation of the computing circuit 602 will now be explained with reference to a flow chart shown in FIG. 4. In the step 40, an initial value is assigned to a quantization step size $\Delta$. Subsequently, the entropy H and the distortion D for this step size are computed in a step 41. This computation will now be described in greater detail.

As already mentioned previously, the step size $\Delta$ is indicative of the spacing between discrete quantization levels. The computing circuit checks how often coefficient $c_i$ has an amplitude n between two amplitudes $t_k$ and $t_{k+1}$ corresponding to quantization level $r_k$. It often holds that $t_k = r_k - \frac{1}{2}$ and $t_{k+1} = r_k + \frac{1}{2} \Delta$ but this is not necessary. By dividing said number by the number of blocks N in a picture, the probability $p_k$ of coefficient $c_i$ assuming the quantization level $r_k$ is determined. This can be written as:

$$p_k = \sum_{n=t_k}^{t_{k+1}} \frac{h_i(n)}{N}$$

Subsequently the computing circuit computes the entropy $H_i$ of coefficient $c_i$ and the entropy H of the picture. These are defined as $$H_i = \sum_k p_k \cdot \log(p_k) \text{ and } H = \sum_{i=0}^{63} H_i, \text{ respectively.}$$

The distortion D of the picture is computed in a comparable manner. The "local" distortion for coefficients $c_i$ is:

$$d_i = \sum_k \sum_{n=t_k}^{t_{k+1}} \frac{h_i(n) \cdot (r_k - n)^2}{N}$$

The distortion per block then is:

$$D = \sum_{i=0}^{63} D_i$$

It is to be noted that the entropy H and the distortion D are both a function of the assumed step size $\Delta$.

Figure 1:
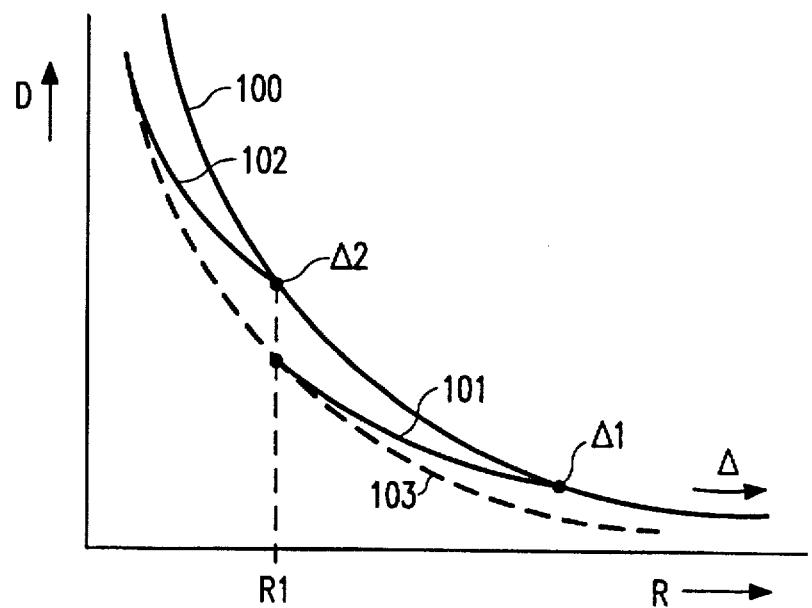
FIG. 1, already described, shows some rate-distortion curves to explain a prior-art device.

If the computing step 41 described were performed for a large number of step sizes $\Delta$, then it would yield an entropy-distortion curve (HD curve). This HD curve is denoted by 500 in FIG. 5. It has been found that the HD curve corresponds to a very satisfactory extent to the RD curve which is denoted by 100 in FIG. 1.

However, it is not necessary to have the HD curve completely available. In fact, the searched Lagrange multiplier $\lambda$ is constituted by the derivative $-dD/dH$ at the point P (see FIG. 5) of the HD curve where the entropy H corresponds to the target number of bits for coding the picture. The point P is found by means of procedures known from numerical mathematics. Any algorithm for determining zeros is suitable for this purpose, for example a "bi-section algorithm". This is denoted in FIG. 4 by means of a step 42 in which it is checked whether the entropy H at the current step size $\Delta$ is sufficiently equal to the target number of bits $R_r$. As long as this is not the case, the computing step 41 is performed with a different step size $\Delta$. For the sake of completeness, it should be noted that the relevant part of the HD curve can be computed from the available histograms. Thus, it is not necessary to code the picture again for each computation of H and D.

In a step 43, the searched $\lambda$ is computed as a derivative of the HD curve. If a point $(H_2, D_2)$ is the point of operation P and two points $(H_1, D_1)$ and $(H_3, D_3)$ are in its proximity, $\lambda$ follows from:

$$-\lambda = \frac{H_1^2(D_2 - D3) + 2H_1H_2(D_2 - D_1) + H_2^2(D_1 - D_2) + 2H_2H_3(D_1 - D_2) + H_3^2(D_1 - D_2)}{(H_1 - H_2)(H_3 - H_1)(H_3 - H_2)}$$

An alternative is the less complex and also less accurate two-point approach of $\lambda$ from two points $(H_1, D_1)$ and $(H_2, D_2)$ proximate to the point of operation:

$$-\lambda = \frac{D_2 - D_3}{H_3 - H_2}$$

Figure 5:
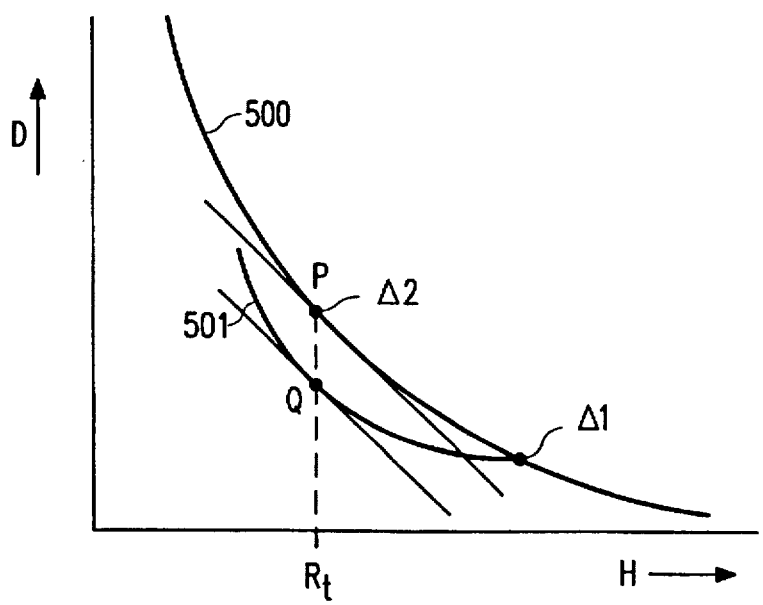
FIG. 5 shows some entropy-distortion diagrams to explain the operation of the λ calculator shown in FIG. 3.

The value of $\lambda$ thus found is applied to quantizer 3 (see FIG. 2). When a picture is being coded, $\lambda$ has the same value for all picture blocks of the picture. FIG. 5 illustrates how the encoder reacts to the applied $\lambda$. In this Figure, the reference numeral 500 denotes the computed HD curve. For $\lambda=0$ (i.e. no modification of the coefficients), the encoder would operate at the point P because the bitrate control circuit 5 (see FIG. 2) generates the step size $\Delta 2$ which actually leads to the target number of bits. However, as will be described, the coefficients are imaged at different quantization levels under the influence of $\lambda$. This causes the number of bits to be reduced. The bitrate control circuit reacts thereto by reducing the step size. More particularly, the bitrate control circuit automatically controls the step size to that value $\Delta 1$ at which the derivative of rate distortion curve 501 at point Q remains equal to the derivative of the HD curve at point P.

Figure 6:
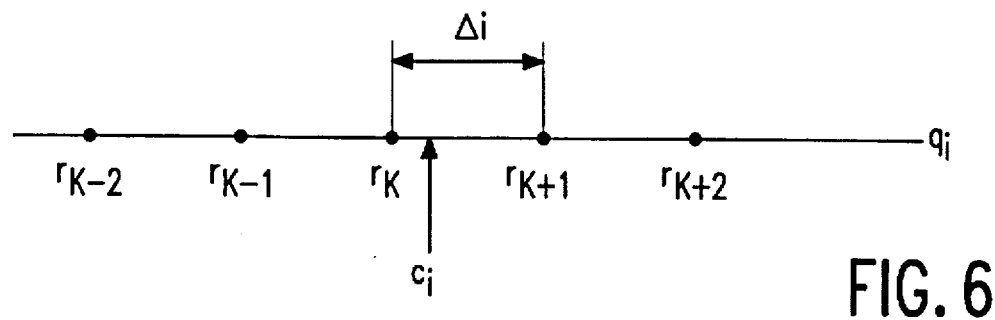
FIG. 6 shows a quantization diagram to explain the operation of a quantizer shown in FIG. 2.

The operation of quantizer 3 will now be explained with reference to FIGS. 6 and 7. FIG. 6 shows a scale of possible values of DCT coefficients $c_i$. The references $r_{k-1}$, $r_k$, $r_{k+1}$, ... denote the discrete quantization levels which the quantized coefficient $q_i$ may assume. Said quantization levels are spaced apart by a step size $\Delta_i$ as described before in response to the step size $\Delta$ which is applied by bitrate control circuit 5 (see FIG. 2).

Figure 7:
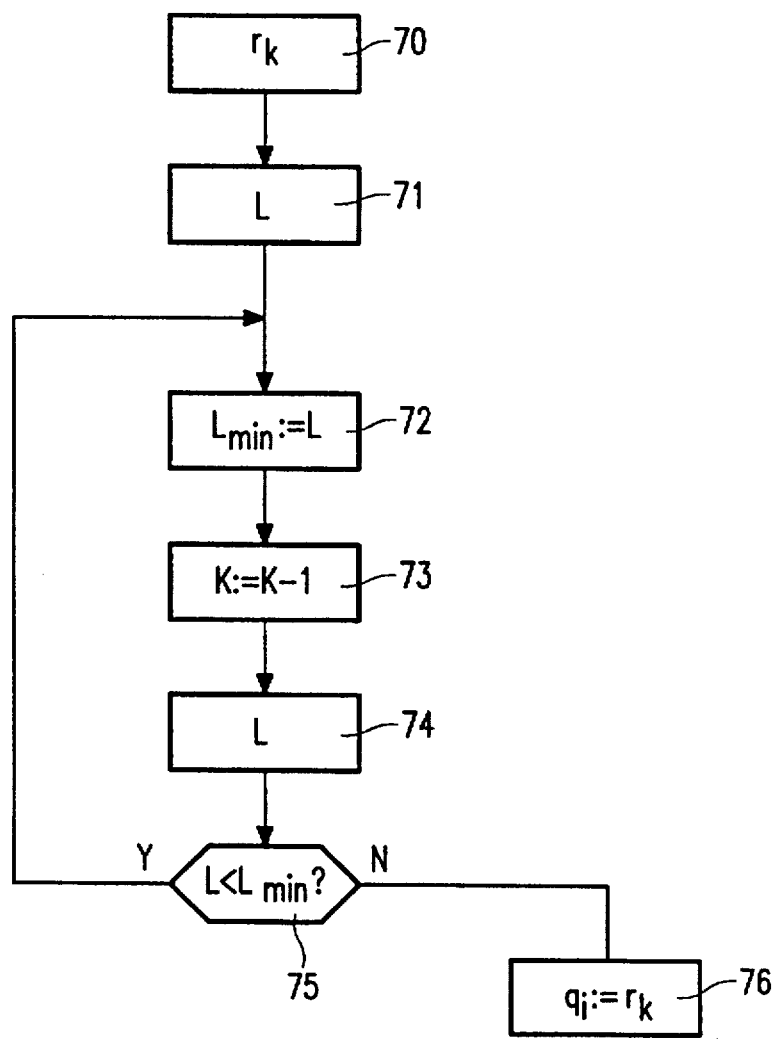
FIG. 7 shows a flow chart to explain the operation of the quantizer shown in FIG. 2.

FIG. 7 shows a flow chart of operations performed by the quantizer on coefficient $c_i$. In an initial step 70, the value of $c_i$ is imaged at the most proximate quantization level $r_k$. In a step 71, the "Lagrangian cost" L is subsequently computed for this quantization level $r_k$ in accordance with the formula:

$$L=(c_i-r_k)^2+\lambda \cdot R_k$$

In this formula, $(c_i-r_k)^2$ is a measure of the distortion which is a result of the approximation of $c_i$ by $r_k$, and $R_k$ is the number of bits required for transmitting $q_i=r_k$. In a step 72, the computed Lagrangian cost L is saved as $L_{min}$.

Subsequently, the coefficient $c_i$ is imaged at a lower quantization level $r_{k-1}$. This is shown in the Figure by decreasing the index k by 1 in a step 73. In a step 74 the Lagrangian cost L is computed for this new quantization level. In a step 75 it is checked whether this Lagrangian cost L is smaller than $L_{min}$. If this is the case, then the lower quantization level $r_{k-1}$ is apparently more favourable in terms of rate-distortion than $r_k$. In other words, the distortion increases but the gain in the number of bits is more important. The quantizer then performs the steps 72-75 again so as to check whether an even lower quantization level is still more favourable. The search for the minimum Lagrangian cost in this way is discontinued as soon as it has been found in step 75 that L increases again. The quantization level corresponding to $L_{min}$ is subsequently selected in a step 76 for quantization of the coefficient $c_i$. The algorithm shown in FIG. 7 is performed for all coefficients $c_i$ of a picture block.

It is to be noted that the level 0 may be reached when a lower quantization level is chosen (step 73). However, zero coefficients are not coded themselves but are included in the code for the next non-zero coefficient. The consequences thereof for the number of bits are included in the term $R_k$ of the formula for L (step 74).

Practical experiments have proved that the quantization level found is hardly ever more than one or two steps below the "conventional" level. Therefore it is also possible and simpler to compute the Lagrangian cost L only for some quantization levels (the "conventional" level $r_k$ and two levels below this level), and to simply select the level which yields the smallest L.

The quantization process described above is referred to as bitrate-constrained quantization of DCT coefficients. It provides a significant improvement of the picture quality in comparison with conventional MPEG coding in which the most proximate quantization level is coded and transmitted for each coefficient.

Figure 8:
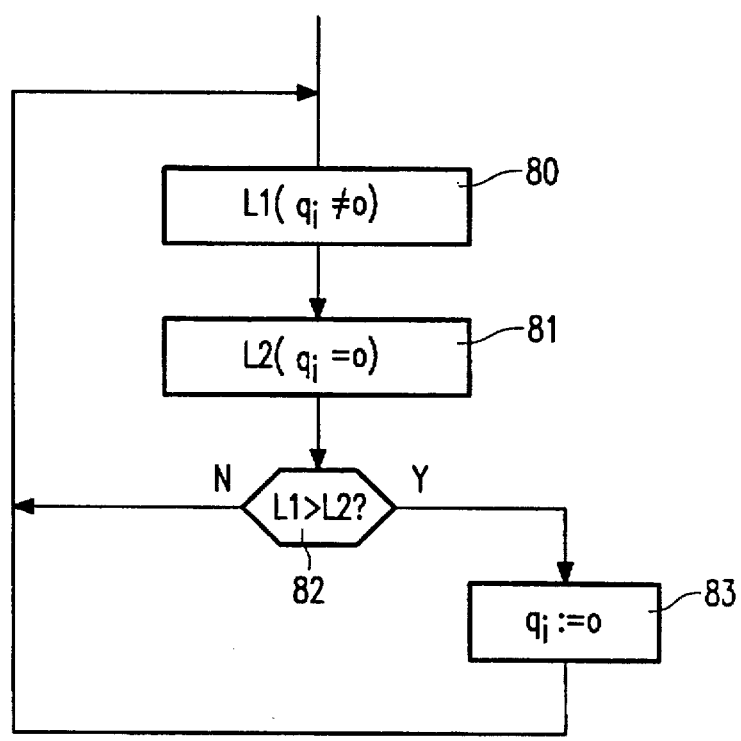
FIG. 8 shows a flow chart to explain a further embodiment of the quantizer shown in FIG. 2.

A further improvement of the picture quality is obtained by subsequently subjecting the coefficients $q_i$ thus obtained to thresholding. As already previously noted, thresholding is understood to mean that selected coefficients are rendered zero. FIG. 8 shows a flow chart of the operations which are performed for this purpose on each non-zero coefficient $q_i$. In a step 80, the Lagrangian cost L1 is computed for this coefficient $q_i \neq 0$ given the current value of $\lambda$. It holds for L1 that:

$$L1=(c_i-q_i)^2+\lambda \cdot R_i$$

in which $R_i$ is the number of bits for transmission of $q_i$ and the possibly preceding zero-coefficients. In a step 81, the Lagrangian cost L2 is computed for the case where the value of zero would be enforced on $q_i$. It holds for L2 that:

$$L2=(c_i-0)^2+\lambda \cdot \Delta R_i$$

in which $\Delta R_i$ is the number of bits which is saved by rendering $q_i$ zero (the coding of $q_i=0$ is included in the coding of the next non-zero coefficient). Subsequently it is checked in a step 82 whether L1>L2. If this is not the case, $q_i$ will remain unchanged. If this is the case, $q_i$ will receive the value of zero in a step 83. The procedure is then repeated for a subsequent non-zero coefficient.

The thresholding algorithm shown in FIG. 8 determines once per coefficient whether it is more favourable to maintain this coefficient or render it zero. This is considerably simpler and less intensive in computation than the algorithm which is described in the afore-mentioned article "Rate-Distortion Optimal Fast Thresholding with complete JPEG/MPEG Decoder Compatibility" which computes all possible thresholding options and selects the most favourable of them. Nevertheless, the form of thresholding described yields a considerable improvement of the picture quality. It has particularly been found that the combination of bitrate-constrained quantization and thresholding significantly improves the picture quality.

An even further improvement is obtained by comparing the Lagrangian cost of a picture block with that of a picture block all coefficients of which have the value of 0. In fact, blocks all coefficients of which have the value of 0 need not be transmitted. It suffices to indicate such empty blocks in a parameter, in MPEG referred to as coded_block_pattern. Obviously, the number of bits involved in encoding coded_block_pattern is taken into account in the $\lambda R$ term of the Lagrangian cost $L=D+\lambda R$.

In summary, the picture quality of an MPEG-encoded video signal is improved considerably by reducing the coefficients after quantization in such a way that the "Lagrangian cost" D+λR (D is distortion, R is bitrate) is minimal for a given value of the "Lagrange multiplier" λ. The distortion decreases because the step size is reduced while the bitrate remains equal.

I claim:

1. A device for coding video pictures, comprising:

a picture transformer for block-sequentially transforming pixels into coefficients;

a quantizer for quantizing the coefficients to one of a plurality of given quantization levels in response to an applied value of λ in order to reduce the sum D+λR for said coefficients, in which D is the distortion and R is the bitrate;

means for calculating the value of λ; and a variable-length coding circuit for coding the quantized coefficients;

characterized in that the quantizer is adapted to quantize said coefficients to a quantization level which is lower than the most proximate quantization level and unequal to zero if the sum of D+λR is reduced for the lower quantization level.

2. A device as claimed in claim 1, wherein the quantizer is adapted to quantize said coefficients to the quantization level for which D+λR is minimal.

3. A device as claimed in claim 1, further comprising means for rendering coefficients zero if said zero-rendering operation yields a lower D+λR for said coefficients.

4. A device as claimed in claim 1, further comprising means for rendering all coefficients of a picture block zero if this yields a lower D+λR for said picture block.

5. A method of coding video pictures, comprising the steps of:

block-sequentially transforming pixels into coefficients;

quantizing the coefficients to one of plurality of given quantization levels in response to an applied value of λ in order to reduce the sum D+λR for said coefficients, in which D is the distortion and R is the bitrate;

calculating the value of λ; and variable-length coding the quantized coefficients; characterized in that the step of quantizing includes the step of quantizing said coefficients in dependence on the value λ to a quantization level which is lower than the most proximate quantization level and unequal to zero.

6. A method as claimed in claim 5, wherein the step of quantizing includes the step of quantizing said coefficients to the quantization level for which D+λR is minimal.

7. A method as claimed in claim 5, further including the step of rendering coefficients zero if said zero-rendering operation yields a lower D+λR for said coefficients.

8. A method as claimed in claim 5, further including the step of rendering all coefficients of a picture block zero if this yields a lower D+λR for said picture block.

* * * * *